United States Patent [19]

Hall

[11] 4,073,344

[45] Feb. 14, 1978

[54] METHODS FOR TREATING SUBTERRANEAN FORMATIONS

[75] Inventor: Bobby E. Hall, Duncan, Okla.

[73] Assignee: Halliburton Company, Duncan, Okla.

[21] Appl. No.: 772,706

[22] Filed: Feb. 28, 1977

Related U.S. Application Data

[62] Division of Ser. No. 533,375, Dec. 16, 1974.

[51] Int. Cl.² .............................................. E21B 43/27
[52] U.S. Cl. ................................ 166/307; 252/8.55 C
[58] Field of Search ............... 166/307, 281, 282, 271, 166/259; 252/8.55 C, 8.55 B

[56] References Cited

U.S. PATENT DOCUMENTS

| 2,024,718 | 12/1935 | Chamberlain | 252/8.55 C |
| 2,356,205 | 8/1944 | Blair, Jr. et al. | 166/307 UX |
| 2,400,395 | 5/1946 | De Groote | 252/8.55 C |
| 2,640,810 | 6/1953 | Cardwell et al. | 252/8.55 C |
| 2,885,004 | 5/1959 | Perry | 166/307 |
| 3,254,718 | 6/1966 | Dunlap | 166/307 |
| 3,601,197 | 8/1971 | Ayers, Jr. et al. | 166/307 |
| 3,819,520 | 6/1974 | Jones et al. | 166/307 X |
| 3,902,557 | 9/1975 | Shaughnessy et al. | 166/307 X |
| 3,953,340 | 4/1976 | Templeton et al. | 252/8.55 C |
| 3,970,148 | 7/1976 | Jones et al. | 252/8.55 C X |

Primary Examiner—Stephen J. Novosad
Attorney, Agent, or Firm—Thomas R. Weaver; John H. Tregoning

[57] ABSTRACT

The present invention provides methods and compositions for treating subterranean formations whereby the loss of formation absorbable additives from the treating compositions is reduced or prevented.

6 Claims, No Drawings

METHODS FOR TREATING SUBTERRANEAN FORMATIONS

This application is a Divisional of application Ser. No. 533,375, filed Dec. 16, 1974.

Aqueous treating solutions are often utilized in treatments carried out in subterranean formations to stimulate the production of fluids from such formations. For example, aqueous acid solutions are commonly used to increase the permeability of formations penetrated by well bores by injecting the acid solution into the formation whereby mineral constituents contained therein are dissolved followed by the subsequent production of spent acid from the formation. Aqueous acid solutions and other aqueous treating solutions are also utilized in carrying out treatments in subterranean formations whereby the formations are fractured and propped or fractured and acidized. In these and other methods of treating subterranean formations utilizing aqueous treating solutions, difficulties are often encountered due to water-oil emulsions which are formed at the interfaces between the injected aqueous treating solution and crude oil contained in the formation. Fines and insoluble reaction products which are formed accumulate at the oil-water interfaces and stabilize the emulsions which in turn tend to plug the pore spaces in the formation being treated and restrict the flow of the treating solution and subsequent production of fluids therethrough. In addition, and particularly where aqueous acid treating solutions are utilized, sludge formed as the result of the reaction of the acid with asphaltic materials contained in the crude oil can plug the pore spaces of the formation.

Heretofore, difficulties of the above-mentioned type encountered in treating siliceous formations with aqueous treating solutions have been particularly severe. Siliceous formations are those containing sandstone and/or other materials which include silicates. While a variety of additives having surface active properties have been developed for preventing the formation of emulsions, sludge, etc., as well as preventing the corrosion of metal surfaces and have been included in the various treating solutions employed, i.e., surface tension reducing agents, demulsifiers, anti-sludge agents, corrosion inhibitors, etc., less than desirable results are often achieved whereby little or no improvement in permeability is obtained.

The ineffectiveness of such prior acidizing treatments and other treatments carried out in subterranean formations, and particularly siliceous formations, is primarily due to the loss of the additives contained in the treating solutions to materials contained in the formation. That is, silicate and other material surfaces present in the treated formations adsorb the various surface active additives included in the treating solutions to prevent corrosion, emulsions, sludge, etc., so that the additives are prevented from functioning which results in the formation of emulsions and sludge, corrosion of metal goods and inadequate treating solution penetration into the pore spaces of the formation. In the interstitial acidizing of a formation whereby an aqueous acid treating solution is pumped into the formation at a pressure level below the formation fracturing pressure, the treating solution contacts an extremely large amount of material surface in the formation which surface adsorbs surface active additives contained in the treating solution.

By the present invention methods and compositions for treating subterranean formations are provided whereby the adsorption of such additives is reduced or prevented thereby allowing such additives to remain in the treating compositions utilized and achieve their designed function.

In accordance with the present invention one or more chemicals having the property of reducing the adsorption of additives having surface active properties contained in aqueous acid and other aqueous treating solutions on silicate and other formation surfaces are combined with the treating solutions thereby avoiding the difficulties brought about by sludge, emulsions, corrosion, etc. mentioned above. Chemicals which are particularly suitable for use in accordance with the present invention are those having the general formula:

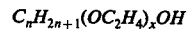

wherein:
$n$ has a value in the range of from about 4 to about 12;
$x$ has a value in the range of from about 1 to about 10;
and the total number of carbon atoms in the chemical is greater than 12.

Examples of chemicals described above are heptyl triethylene oxide ethanol, heptyl tetraethylene oxide ethanol, isoctyl tetraethylene oxide ethanol, hexyl triethoxy ethanol, octyl triethoxy ethanol and hexyl tetraethoxy ethanol. Of these, hexyl triethoxy ethanol, octyl triethoxy ethanol and hexyl tetraethoxy ethanol are preferred with hexyl triethoxy ethanol being the most preferred.

The above-described chemicals fall into a class known as mutual solvents in that they are miscible with both oil and water. In subterranean formations the chemicals render the formation, as well as fines and insoluble reaction products contained therein, water wet thereby retarding the formation of solid stabilized water-oil emulsions and improving the oil permeability of the formation. More importantly, as stated above, the chemicals reduce or prevent the adsorption on silicate and other surfaces in the formation of both cationic and anionic surfactants and other additives having surface active properties which function as demulsifiers, antisludgers, surface tension reducer, corrosion inhibitors, etc., in aqueous treating solutions.

The novel compositions of this invention for treating subterranean formations are basically comprised of a solution containing at least one additive for imparting desired properties to the solution and/or to the formation to be treated and a chemical of the type described above having the property of reducing the adsorption of said additive by materials contained in the formation.

The additive or additives included in the compositions for imparting desired properties to the compositions and to formations treated with the compositions can be any of a variety of conventional additives or other materials having surface active properties utilized heretofore in aqueous treating solutions. For example, corrosion inhibitors designed to protect tubular goods and other equipment surfaces contacted by acid treating solutions against acid attack include inorganic arsenic compounds, acetylenic alcohols, thiophenols, heretocyclic nitrogen compounds, substituted thioureas, rosin amine derivatives, quaternary ammonium compounds, and other similar organic agents. A particularly suitable corrosion inhibitor for use with the acid treating compositions of the present invention is a mixture of propargyl alcohol, alkyl pyridine, methyl Formcel, diacetone alcohol and ethyl octynol.

A variety of other additives can be utilized in the treating compositions of the present invention including surfactants which function as demulsifiers, wetting agents, anti-sludge agents and retarding agents. In addition, additives for gelling the compositions, for reducing the pressure drop while the compositions are being introduced into the formation to be treated, for reducing fluid losses during treatment of the formation, for temporary plugging more permeable portions of the formation as well as other additives compatible with the compositions can be utilized in the compositions.

As indicated above, preferred compositions of the invention include additives which function as demulsifiers, anti-sludge agents, surface tension reducing agents and corrosion inhibitors. Particularly suitable additives which function as demulsifiers in aqueous solutions are alkyl benzene sulfonate, myristic dimethyl benzene ammonium chloride and decyl trimethyl amminium chloride with myristic demethyl benzene ammonium chloride being preferred. A preferred additive which functions as an anti-sludge agent is dodecyl benzene sulfonate. A preferred surfactant which functions as a surface tension reducing agent is ethoxylated nonyl phenol.

The concentrations of the additives utilized in the compositions of this invention can vary depending upon the particular formation to be treated, the particular treating solution utilized and the particular additives added thereto. Generally, however, the additives are utilized in the compositions of this invention in amounts in the range of from about 0.1% to about 10% by volume of treating solution used.

In acid treating compositions of the present invention, demulsifying additives are preferably utilized in the compositions in an amount in the range of from about 0.1% to about 5% by volume of water and acid used. Anti-sludge additives are preferably utilized in the compositions in an amount in the range of from about 0.1% to about 2% by volume of water and acid used, surface tension reducing additives are preferably utilized in an amount in the range of from about 0.1% to about 1% by volume of water and acid used, and corrosion inhibitor additives are preferably utilized in an amount in the range of from about 0.1% to about 2% by volume of water and acid used.

The concentration in the treating compositions of the chemical or chemicals mentioned above for reducing the adsorption of additives on formation surfaces can vary over a range of from about 1% to about 90% by volume of the compositions. At concentrations of less than about 1% by volume, too little of the chemical is present in the compositions to effectively reduce adsorption of the additives. At concentrations above about 90% by volume of the compositions, more chemical is generally present in the compositions than necessary to effectively reduce adsorption of the additives. While the particular concentration of the adsorption reducing chemical utilized depends on a variety of factors such as the particular size and type of formation to be treated, the chemical or chemicals are preferably utilized in the compositions in an amount in the range of from about 5% to about 10% by volume of composition.

In treating subterranean formations to increase the permeability thereof by contacting the formations with an aqueous acid solution, the particular acid employed will depend in part upon the particular type of formation to be treated. Particularly suitable acids for treating siliceous formations are hydrochloric acid, hydrofluoric acid, phosphoric acid, acetic acid, formic acid, and mixtures of two or more of said acids. Aqueous hydrochloric acid solutions and aqueous solutions containing a mixture of hydrochloric and hydrofluoric acids are preferred for use in accordance with the present invention.

Particularly suitable compositions for acidizing siliceous formations are comprised of water; an acid selected from the group consisting of hydrochloric acid, hydrofluoric acid, phosphoric acid, acetic acid, formic acid and mixture of two or more of said acids, the acids being present in the composition in an amount in the range of from about 1% to about 15% by weight of water and acid utilized; at least one additive for imparting desired properties to the aqueous acid solution and to the siliceous formation to be treated present in the composition in an amount of from about 0.1% to about 10.0% by volume of the water and acid utilized; and a chemical of the type described above having the property of reducing the adsorption of the additive on silicate surfaces present in the composition in an amount in the range of from about 1% to about 90% by volume of the composition.

A particularly preferred composition including hydrochloric acid is comprised of water; hydrochloric acid present in an amount in the range of from about 5% to about 7.5% by weight of water and acid used; a demulsifying additive present in an amount in the range of from about 0.1% to about 5% by volume of water and acid used; an anti-sludge additive present in an amount in the range of from about 0.1% to about 2% by volume of water and acid used; a surface tension reducing additive present in an amount in the range of from about 0.1% to about 1% by volume of water and acid used; a corrosion inhibitor additive present in an amount in the range of from about 0.1% to about 2% by volume of water and acid used; and hexyl triethoxy ethanol present in said composition in an amount in the range of from about 5% to about 10% by volume of said composition.

A preferred hydrochloric-hydrofluoric acid composition of the present invention is comprised of water; hydrochloric acid present in an amount of about 12% by weight of water and acid used; hydrofluoric acid present in an amount of about 3% by weight of water and acid used; a demulsifying additive present in an amount in the range of from about 0.1% to about 5% by volume of water and acid used; an anti-sludge additive present in an amount in the range of from about 0.1% to about 2% by volume of water and acid used; a surface tension reducing additive present in an amount in the range of from about 0.1% to about 1% by volume of water and acid used; a corrosion inhibitor additive present in an amount in the range of from about 0.1% to about 2% by volume of water and acid used; and hexyl triethoxy ethanol present in said composition in an amount in the range of from about 5% to about 10% by volume of said composition.

The methods of this invention for reducing the loss of additives having surface active properties from a treating solution utilized in the treatment of subterranean formations basically comprises the steps of combining with the treating solution a chemical having the property of reducing the adsorption of said additives on material surfaces in the formation having the general formula:

$$C_nH_{2n+1}(OC_2H_4)_xOH$$

wherein:
n has a value in the range of from about 4 to about 12;
x has a value in the range of from about 1 to about 10;
and the total number of carbon atoms in said chemical is greater than 12;
and introducing the treating solution-chemical mixture into the formation.

In carrying out acidizing treatments in subterranean formations to stimulate the production of fluids therefrom in accordance with the present invention, an aqueous acid composition capable of dissolving mineral constituents present in the formation, containing at least one additive for imparting desired treating properties to the acid solution and to the formation and containing a chemical of the type described above having the property of reducing the adsorption of the additive on surfaces in the formation is introduced into the formation. After the acid composition has spent itself in the formation, i.e., used up its capacity to dissolve mineral constituents therein, the composition is recovered from the formation. As will be apparent, because the aqueous treating composition contains additives for imparting desired properties to the solution and to the formation being treated, and contains a chemical preventing the adsorption and removal of such additives, the treatment is carried out without encountering difficulties of the type mentioned above.

In carrying out the method of the present invention for improving the permeability of a siliceous formation, the formation is treated with an aqueous acid composition containing an acid selected from the group consisting of hydrochloric acid, hydrofluoric acid, phosphoric acid, acetic acid, formic acid and mixtures of two or more such acids, additives selected from the group consisting of corrosion inhibitors, surface tension reducing agents, demulsifiers, anti-sludge agents and mixtures thereof and one or more chemicals of the type described above having the property of reducing the adsorption of the additives on silicate surfaces.

A presently preferred technique for acidizing a siliceous formation in accordance with the present invention involves preflushing the formation by introducing thereinto a composition of the present invention comprised of water, hydrochloric acid present in the composition in an amount in the range of from about 5% to about 7½% by weight of water and acid used, demulsifying, anti-sludge, surface tension reducing, and corrosion inhibitor additives present in the composition in an amount in the range of from about 0.1% to about 10% by volume of water and acid used, and hexyl triethoxy ethanol present in the composition in an amount in the range of from about 5% to about 10% by volume of the composition.

After the preflushing step with the hydrochloric acid composition described above is carried out, a second acid treating solution is introduced into the formation comprised of water, hydrochloric acid present in an amount of about 12% by weight of water and acid used and hydrofluoric acid present in an amount of about 3% by weight of water and acid used.

The preflush treating composition functions to dissolve carbonaceous materials contained in the formation, shrink swollen clays and condition the formation with the additives utilized. The subsequent introduction of the hydrochloric-hydrofluoric acid treating composition brings about the dissolution of siliceous and other materials contained in the formation thereby increasing the permeability thereof. Because the preflush composition contains additives and a chemical preventing the adsorption thereof by silicate surfaces, the subsequently introduced hydrochloric-hydrofluoric acid composition generally need not contain additional additives and chemical. However, to insure that emulsions, sludge, etc. are not formed in the formation, additional additives and chemical can be combined with the hydrochloric-hydrofluoric acid composition.

After the formation has been contacted with the hydrochloric-hydrofluoric acid composition whereby it has become spent, it, as well as the preflush composition, are recoveered from the formation by producing the formation through tubular goods disposed in the well bore and surface equipment. Because the additives remain in the treating compositions throughout the treatment, the formation of emulsions and sludge and the corrosion of the tubular goods and surface equipment is reduced or prevented. Further, the surface tension reducing additives remaining in the spent treating solutions bring about fast clean-up of the formation and equipment and minimize down time.

An alternate preferred technique for carrying out the methods of the present invention involves introducing a first aqueous treating composition into the formation comprised of one or more of the various additives mentioned above in an amount of about 10% by volume of the composition and one or more of the chemicals mentioned above having the property of preventing adsorption of the additives present in the composition in an amount of about 90% by volume. The first composition is introduced into the formation in a quantity sufficient to condition the formation and provide a barrier of additives and chemical between the natural fluids contained in the formation and subsequently introduced treating fluids.

The introduction of the additives-chemical solution is followed by the introduction of the acid containing compositions of the present invention which dissolve mineral constituents contained in the formation without the formation of emulsions, sludge, etc., after which the compositions are recovered from the formation. As will now be apparent, the first treating composition introduced into the formation can contain a quantity of additives, and chemical sufficient to produce the results required without the necessity of including additives and chemicals in the subsequently introduced treating compositions. However, it is preferred that even when a first treating composition is employed containing only additives and chemicals, the subsequent acid containing treating compositions also include additives and chemicals to insure the additives are continuously present in the various compositions and perform their designed functions.

The present invention is further illustrated by the following example.

EXAMPLE

Acid treating compositions of the present invention are prepared comprised of water, hydrochloric acid present in the compositions in an amount of 7.5% by weight of water and acid, a corrosion inhibitor additive, namely, a mixture of propargyl alcohol, alkyl pyridine, methyl Formcel, diacetone alcohol and ethyl octynol present in the composition in an amount of 0.3% by volume of water and acid used, a surface tension reducing additive, namely, myristic dimethyl benzene ammonium chloride present in the composition in an amount of 0.5% by volume of water and acid used, and the chemical for reducing the adsorption of additives on formation surfaces shown in Table I below present in the composition in an amount of 10% by volume of the composition.

The various compositions are flowed through a column containing siliceous material, i.e., sand, and the change in surface tension and emulsion tendency of the compositions after flowing through the column are determined. That is, the surface tension and emulsion efficiency of each composition are determined before and after flowing through the silicate column so that the loss of additives due to the adsorption thereof on the silicate materials contained in the column is illustrated.

The surface tensions of the compositions are tested using a conventional du Nouy Tensiometer. The emulsion efficiencies of the compositions are determined by mixing equal volumes of samples of the compositions and oil in a high speed stirrer for one minute, transferring the resulting emulsion into a graduated cylinder and after allowing the emulsion to stand for ten minutes noting the volume of liquid which is separated. The separated volume of liquid is then converted to percent of the total volume of composition tested so that the emulsion efficiency of the composition is expressed in percent.

The results of these tests are shown in Table I below.

formation, said chemical being present in said aqueous hydrochloric acid solution in an amount in the range of from about 1% to about 90% by volume of said acid solution-chemical mixture and having the general formula:

$$C_nH_{2n+1}(OC_2H_4)_xOH$$

wherein:
n has a value in the range of from about 4 to about 12;
x has a value in the range of from about 1 to about 10;
and the total number of carbon atoms in said chemical is greater than 12;
treating said formation with an aqueous hydrochloric-hydrofluoric acid treating solution capable of dissolving mineral constituents contained in said formation; and
recovering said preflush and treating solutions from said formation.

2. The method of claim 1 wherein said chemical is selected from the group consisting of hexyl triethoxy ethanol, octyl triethoxy ethanol, hexyl tetraethoxy ethanol, and mixtures of the foregoing compounds.

3. A method of treating a siliceous formation to improve the permeability thereof comprising the steps of:
contacting said formation with a composition consisting essentially of a mixture of an aqueous hydrochloric acid solution and a mutual solvent, then
contacting said formation with an aqueous treating solution comprising hydrochloric acid and hydrofluoric acid having a concentration capable of dissolving mineral constituents contained in said for-

TABLE I
COMPARISON OF SURFACE TENSION REDUCER AND DEMULSIFIER ADDITIVE ADSORPTION ON SILICATE SURFACES FROM VARIOUS AQUEOUS ACID COMPOSITIONS

| Adsorption Reducer Chemical In Composition | Increase in Surface Tension of Composition After Contacting Silicate Surfaces, Dynes/cm. | Change in Emulsion Efficiency of Composition After Contacting Silicate Surfaces (Percent Settled After Contact Less Percent Settled Before Contact) |
|---|---|---|
| None | 15.8 | −90 |
| $C_3H_7(OC_2H_4)OH$ | 11.2 | −88 |
| $C_3H_7(OC_2H_4)_2OH$ | 8.0 | −96 |
| $C_4H_9(OC_2H_4)_2OH$ | 6.1 | −90 |
| $C_4H_9(OC_2H_4)_3OH$ | 11.2 | −76 |
| $C_6H_{13}(OC_2H_4)_4OH$ | 1.2 | 0 |
| $C_8H_{17}(OC_2H_4)_3OH$ | 0.5 | 0 |
| $C_6H_{13}(OC_2H_4)_{4.5}OH$ | 1.0 | +2 |

From Table I it can clearly be seen that the additive adsorption reducing chemicals and compositions of this invention effectively reduce or prevent additives in the compositions from being adsorbed on silicate surfaces. Further, it can clearly be seen that when the chemical utilized takes the general formula:

$$C_nH_{2n+1}(OC_2H_4)_xOH$$

and the total number of carbon atoms therein is greater than 12, such chemical is markedly more effective in reducing surface active additive adsorption than chemicals of the same formula wherein the total number of carbon atoms is less than 12.

What is claimed is:

1. A method of improving the permeability of a siliceous formation comprising the steps of:
preflushing said formation with an aqueous hydrochloric acid solution containing at least one additive for imparting desired properties to said solution and to said formation and containing a chemical having the property of reducing the adsorption of said additive on silicate surfaces present in said mation, and then
removing said composition and said treating solution from said formation, wherein
said mutual solvent is present in said composition in an amount in the range of from about 1 percent to about 90 percent by volume of said composition and is selected from chemicals having the general formula:

$$C_nH_{2n+1}(OC_2H_4)_xOH$$

wherein
n has a value in the range of from about 4 to about 12;
x has a value in the range of from about 1 to about 10;
and the total number of carbon atoms in said chemical is greater than 12, and mixtures thereof, and
wherein said aqueous hydrochloric acid solution contains an additive selected from the group consisting of corrosion inhibitors, surface tension reducing agents, demulsifiers, anti-sludge agents, and mixture thereof, and said additive is present in said hydrochloric acid solution in an amount in the range of from about 0.1 percent to about 10.0 percent by volume of said hydrochloric acid solution.

4. The composition of claim 3 wherein said mutual solvent is selected from the group consisting of hexyl triethoxy ethanol, octyl triethoxy ethanol, hexyl tetraethoxy ethanol, and mixtures thereof, and is present in said composition in an amount in the range of from about 5 percent to about 10 percent by volume of said composition.

5. The method of claim 3 wherein said aqueous treating solution is further comprised of said mutual solvent.

6. The method of claim 5 wherein said aqueous treating solution is still further comprised of at least one of said additives.

* * * * *